(12) United States Patent
Raye (10) Patent No.: US 12,329,130 B1
(45) Date of Patent: Jun. 17, 2025

(54) WINDOW MOUNTED BIRD FEEDER DEVICE

(71) Applicant: Natalie Raye, Auburn, ME (US)

(72) Inventor: Natalie Raye, Auburn, ME (US)

( * ) Notice: Subject to any disclaimer, the term of this patent is extended or adjusted under 35 U.S.C. 154(b) by 0 days.

(21) Appl. No.: 18/585,245

(22) Filed: Feb. 23, 2024

(51) Int. Cl.
*A01K 39/01* (2006.01)

(52) U.S. Cl.
CPC .................................. *A01K 39/01* (2013.01)

(58) Field of Classification Search
CPC ................................ A01K 39/01; A01K 31/14
USPC .......................................................... 119/428
See application file for complete search history.

(56) References Cited

U.S. PATENT DOCUMENTS

| | | | | |
|---|---|---|---|---|
| 1,543,739 A * | 6/1925 | Vowels | ...................... | E06B 7/28 |
| | | | | 454/183 |
| 2,430,541 A * | 11/1947 | Thatcher | .............. | A01K 39/014 |
| | | | | D30/124 |
| 3,291,100 A * | 12/1966 | Negaard | .............. | A01K 39/014 |
| | | | | 119/57.8 |
| 3,593,467 A * | 7/1971 | Francis | ...................... | E06B 7/28 |
| | | | | 312/286 |
| 4,881,491 A * | 11/1989 | Brown | ................... | A01K 39/00 |
| | | | | 119/51.01 |
| 5,782,205 A | 7/1998 | Veras | | |
| 5,957,087 A * | 9/1999 | Bonder | ................. | A01K 39/014 |
| | | | | 119/462 |
| 6,062,167 A * | 5/2000 | Soley | ...................... | A01K 39/00 |
| | | | | 119/57.8 |
| 6,314,912 B1 | 11/2001 | Armbruster | | |
| 6,857,394 B2 | 2/2005 | Redford | | |
| D658,338 S * | 4/2012 | Law | ............................. | D30/124 |
| 9,702,502 B2 | 7/2017 | Hudepohl | | |
| 10,194,642 B2 | 2/2019 | Ellis | | |
| D977,734 S | 2/2023 | Stoutt | | |
| 2015/0342153 A1* | 12/2015 | Hudepohl | .............. | A01K 39/01 |
| | | | | 119/61.3 |
| 2022/0110300 A1* | 4/2022 | Chong | ................. | A01K 39/014 |
| 2023/0019324 A1 | 1/2023 | Reese | | |

FOREIGN PATENT DOCUMENTS

CA 2460860 9/2004

* cited by examiner

*Primary Examiner* — Joshua J Michener
*Assistant Examiner* — Nicole Paige MacCrate (57) ABSTRACT

A window mounted bird feeder device for attracting and watching birds in the comfort of the home includes a housing having a base wall that is coupled to a pair of side walls and a back wall. A bottom edge of the back wall is spaced from a top surface of the base wall to define a back opening into the housing. A border extends along the base wall, up each of the pair of side walls, and between the pair of side walls. The border extends outwardly from the housing to physically abut a window frame and inhibit the housing from falling out of the window frame. A shelf coupled to the housing extends forwardly from the front side. A tray is removably positionable within the interior space through the back opening. The tray blocks the back opening when the tray is positioned within the interior space.

14 Claims, 6 Drawing Sheets

WINDOW MOUNTED BIRD FEEDER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bird feeders and more particularly pertains to a new bird feeder for attracting and watching birds in the comfort of the home.

(2) Description of Related Art Including Information Disclosed Under 37 CFR 1.97 and 1.98

The prior art relates to bird feeders. Typically, bird feeders are designed and configured to be mounted to a tree or stood on the ground. Bird feeders can attract myriad birds, squirrels, and other wildlife. Watching the wildlife can be a relaxing, stress-reducing hobby. However, putting up a bird feeder requires a yard or other outdoor space. Birdwatchers also need to either be able to see the bird feeder from indoors, or they need to stay outdoors to observe the wildlife. Prior art birdfeeders also require people to venture outdoors to refill and clean the birdfeeder. Thus, there is a need for a bird feeder that will attract wildlife directly to a window space where a user can observe the wildlife from indoors. There is also a need for a bird feeder that a user can clean and refill from indoors.

BRIEF SUMMARY OF THE INVENTION

An embodiment of the disclosure meets the needs presented above by generally comprising a housing having a base wall that is coupled to a pair of side walls and a back wall. Each of the pair of side walls and the back wall extends upwardly from the base wall to define an interior space. A front side of the housing is open. A bottom edge of the back wall is spaced from a top surface of the base wall to define a back opening into the interior space through a back side of the housing. A border extends along the base wall, up each of the pair of side walls, and between the pair of side walls. The border is aligned with the front side of the housing. The border extends outwardly from the housing and is configured to physically abut a window frame whereby the border is configured to inhibit the housing from falling out of the window frame. A shelf is coupled to the housing and extends forwardly from the front side of the housing. The shelf has an upper surface that is coplanar with the top surface of the base wall. A tray is removably positionable within the interior space through the back opening. The tray has a height being complementary to a height of the back opening such that the tray blocks the back opening when the tray is positioned within the interior space.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
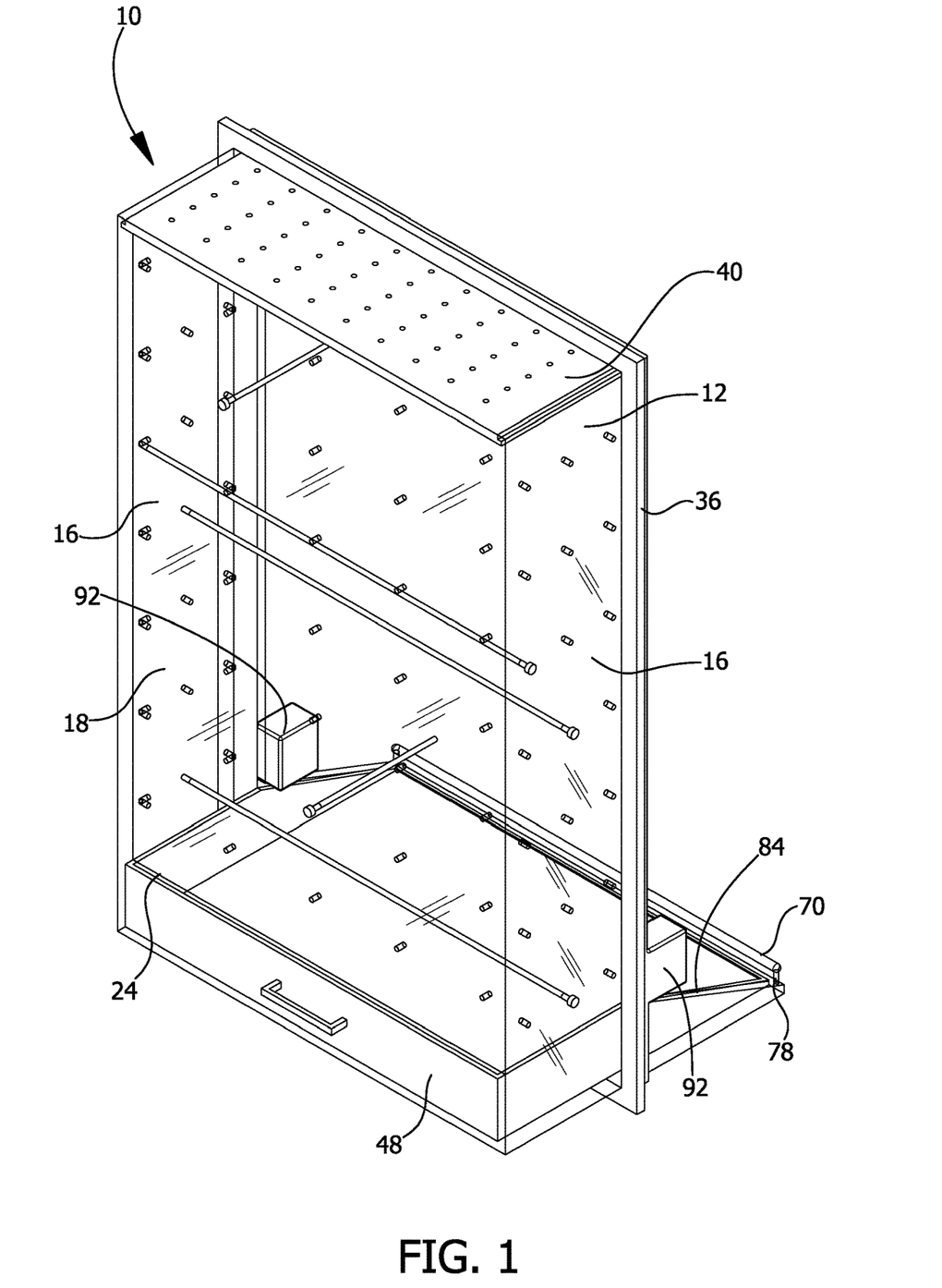
FIG. 1 is an isometric view of a window mounted bird feeder device according to an embodiment of the disclosure.
Figure 2:
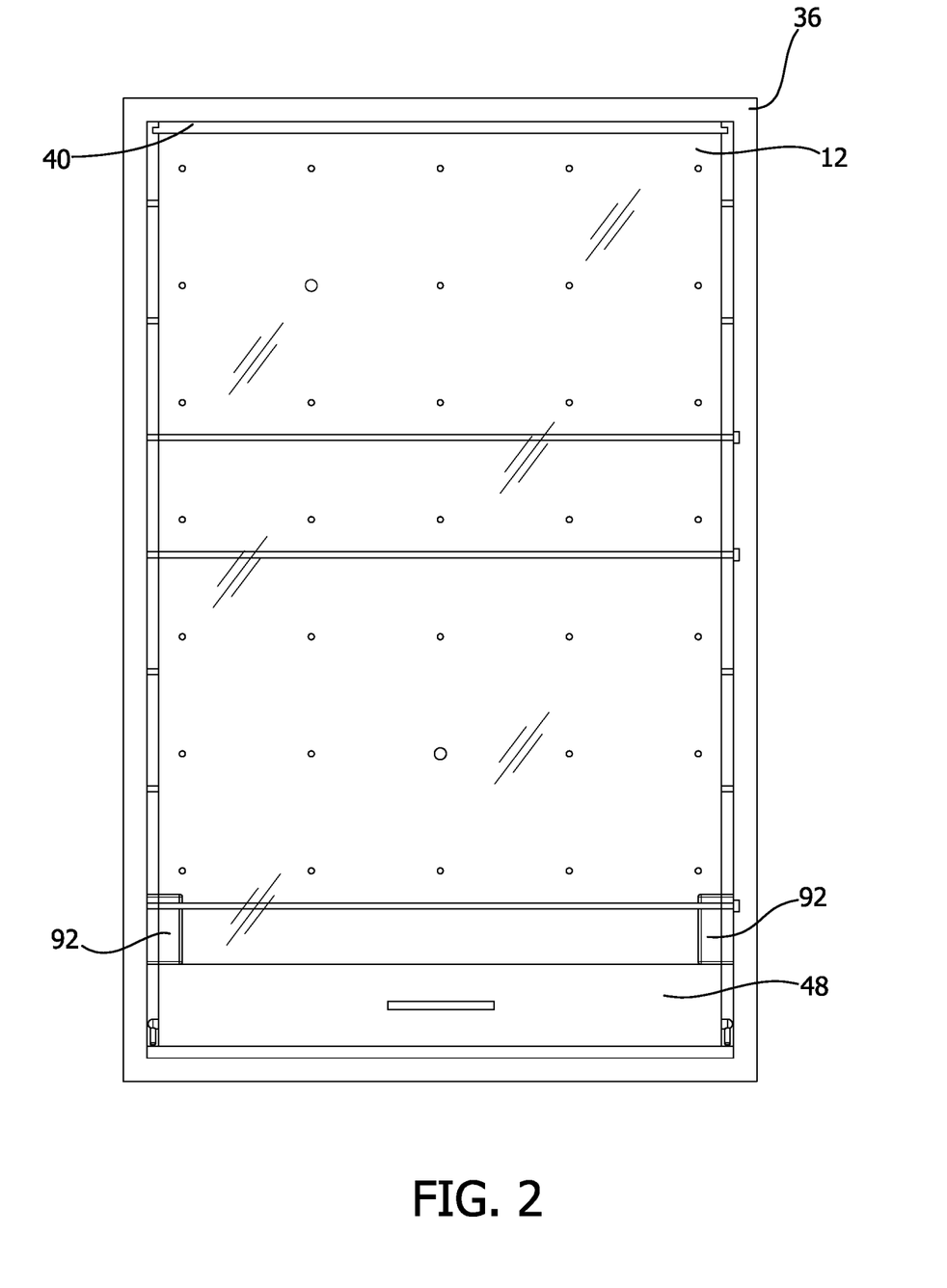
FIG. 2 is a front view of an embodiment of the disclosure.
Figure 3:
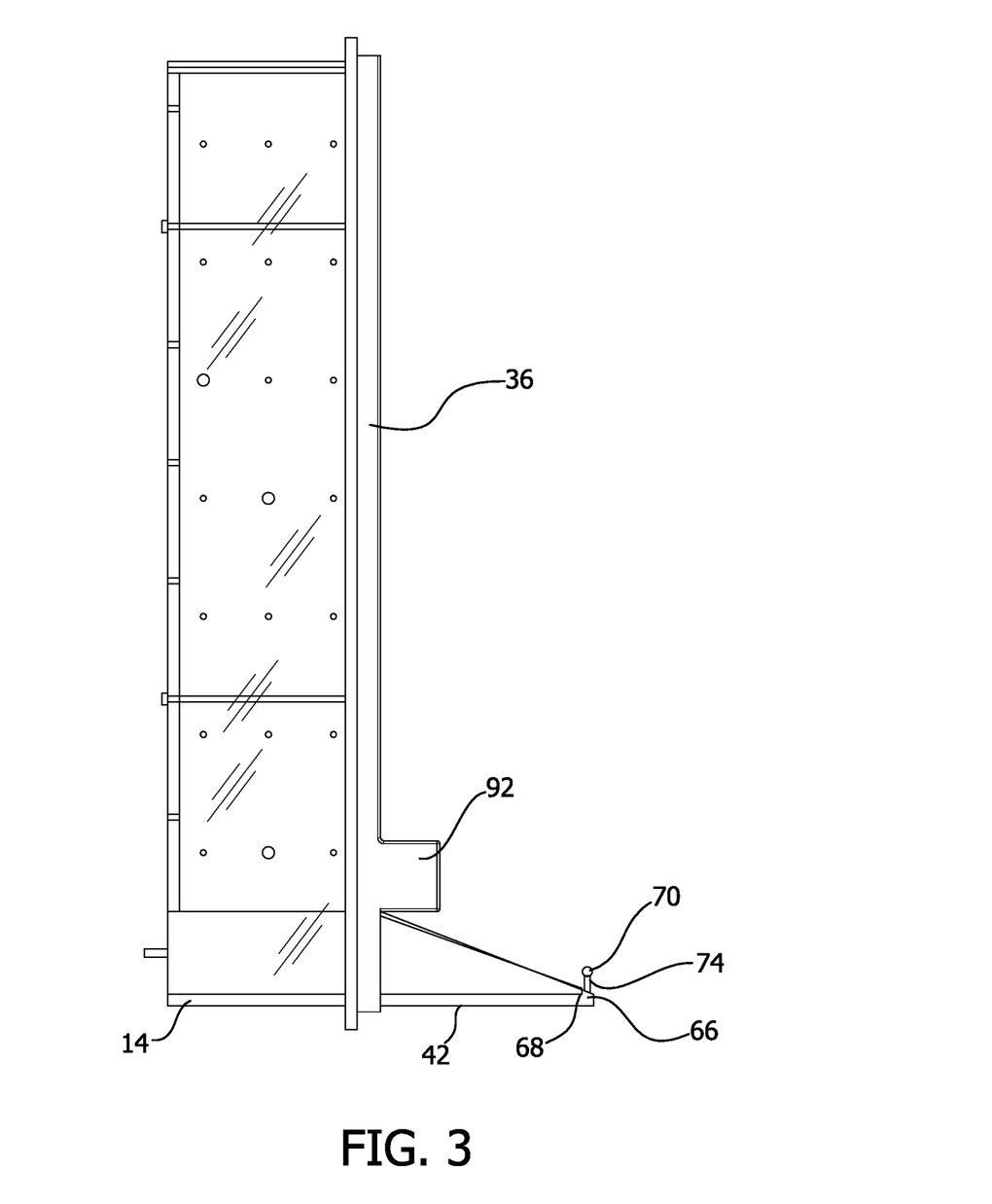
FIG. 3 is a side view of an embodiment of the disclosure.
Figure 4:
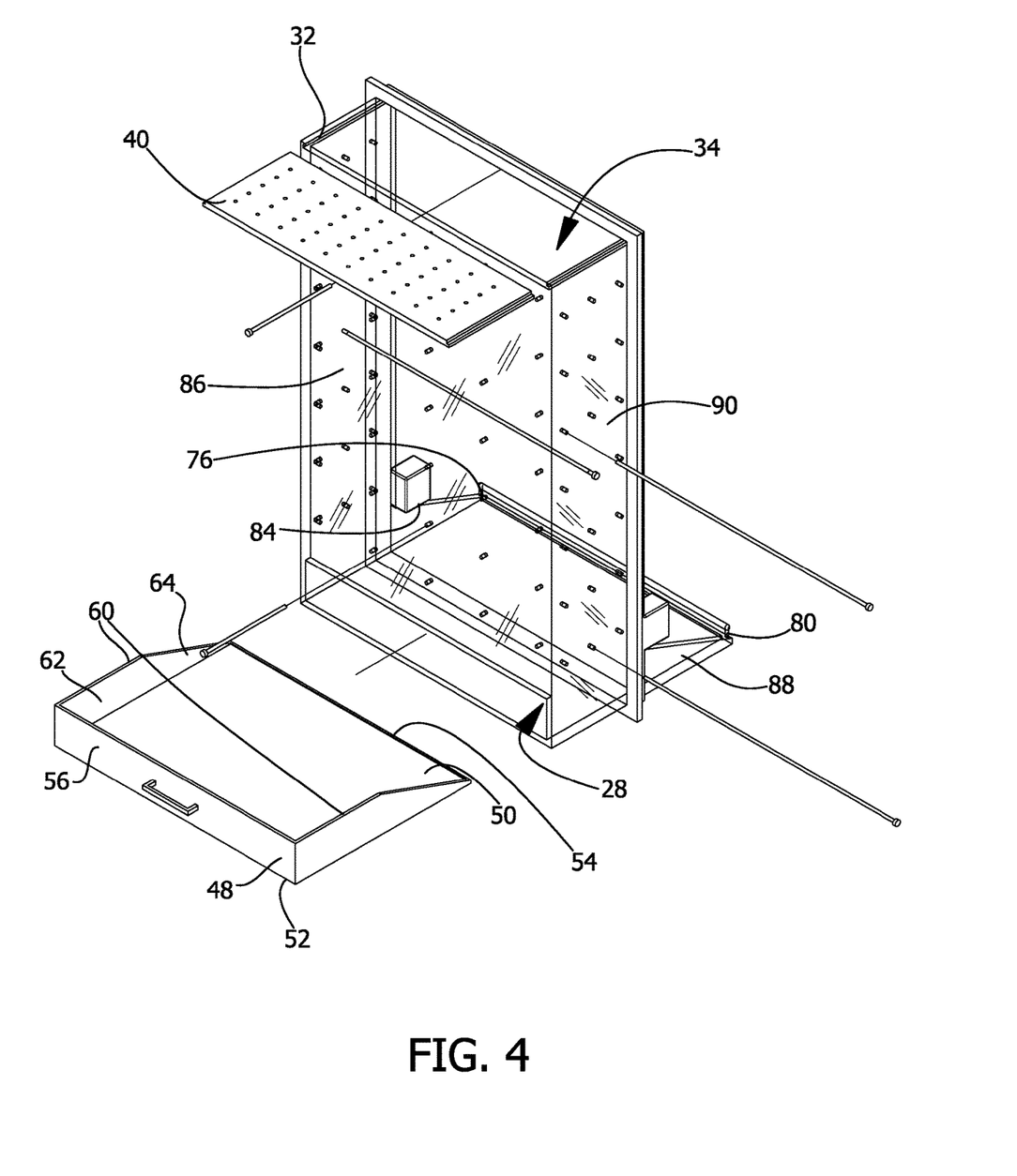
FIG. 4 is an exploded view of an embodiment of the disclosure.
Figure 5:
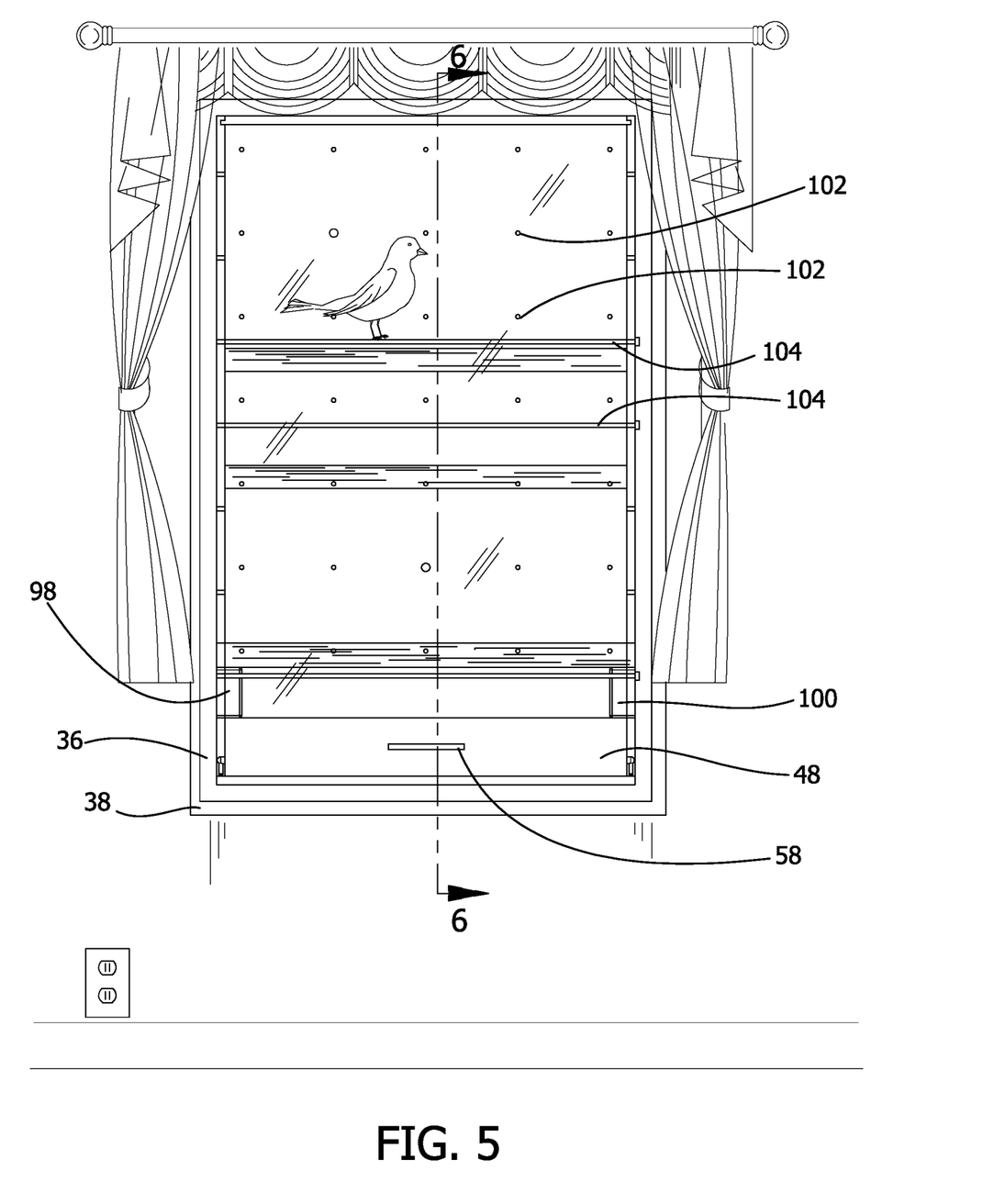
FIG. 5 is an in-use view of an embodiment of the disclosure.
Figure 6:
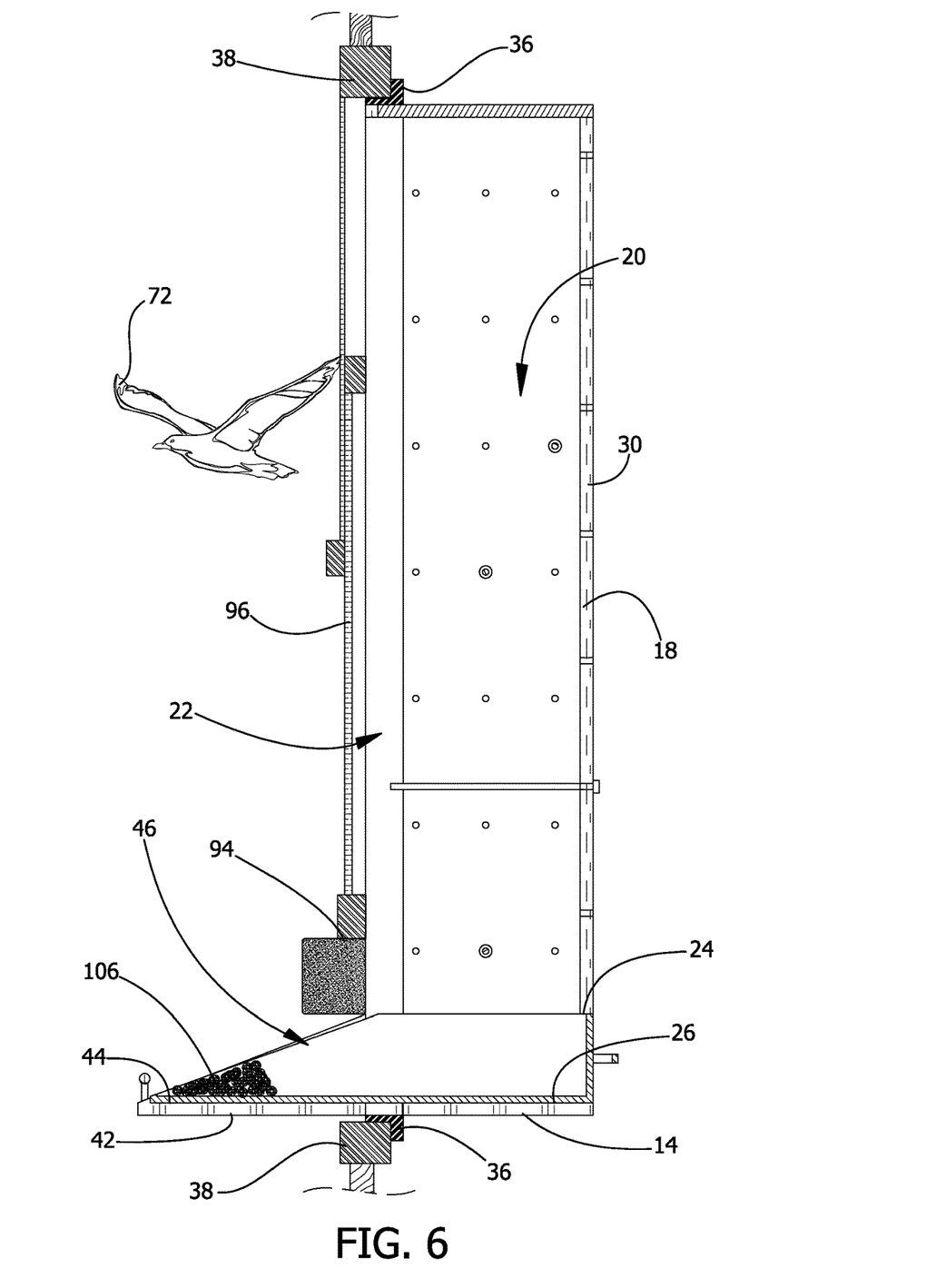
FIG. 6 is a cross-sectional view of an embodiment of the disclosure.

With reference now to the drawings, and in particular to FIGS. 1 through 6 thereof, a new bird feeder embodying the principles and concepts of an embodiment of the disclosure and generally designated by the reference numeral 10 will be described.

As best illustrated in FIGS. 1 through 6, the window mounted bird feeder device 10 generally comprises a housing 12 having a base wall 14 being coupled to a pair of side walls 16 and a back wall 18. Each of the pair of side walls 18 and the back wall 16 extend upwardly from the base wall 14 to define an interior space 20. A front side 22 of the housing 12 is generally open. A bottom edge 24 of the back wall 18 is generally spaced from a top surface 26 of the base wall 14 to define a back opening 28 into the interior space 20 through a back side 30 of the housing 12. A top edge 32 of each of the pair of side walls 16 and the back wall 18 may define an upper opening 34 into the interior space 20 of the housing 12. The housing 12 may be transparent.

A border 36 may extend along the base wall 14, up each of the pair of side walls 16, and across the upper opening 34 between the top edges 32 of each of the pair of side walls 16. The border 36 may be aligned with the front side 22 of the housing 12. The border 36 generally extends outwardly from the housing 12 wherein the border 36 is configured to provide a physical abutment against a window frame 38 whereby the border 36 is configured to inhibit the housing 12 from falling out of the window frame 38. In some embodiments, the border 36 may be attached or coupled to the window frame 38 to further stabilize the housing 12 within the window frame 38.

A lid 40 may be removably couplable to the top edge 32. For example, the lid 40 may be slidably engageable with the top edge 32 to close the upper opening 34 and inhibit access into the interior space 20 of the housing 12 through the upper opening 34. The lid 40 may be foraminous to facilitate airflow through the housing 12. The lid 40 may be transparent.

A shelf 42 may be coupled to the housing 12 and may extend forwardly from the front side 22 of the housing 12. The shelf 42 may have an upper surface 44 that is coplanar with the top surface 26 of the base wall 14. The shelf 42 may be an integral extension of the base wall 14. The shelf 42 may have an open top side 46 permitting access into the interior space 20 of the housing 12.

A tray 48 may be removably positionable within the interior space 20 through the back opening 28. The tray 48 may have a length that is complementary to a combined length of the base wall 14 and the shelf 42 such that the tray 48 covers the top surface 26 of the base wall 14 and the upper surface 44 of the shelf 42 when the tray 48 is positioned within the interior space 20. The tray 48 may have a height that is complementary to a height of the back opening 28 such that the tray 48 blocks the back opening 28 when the tray 48 is positioned within the interior space 20. The tray 48 may be transparent.

The tray 48 may further comprise a first board 50 that is parallel to the top surface 26 of the base wall 14 and the upper surface 44 of the shelf 42 when the tray 48 is positioned within the interior space 20. The first board 50 generally has a first edge 52 and a second edge 54.

A second board 56 may be coupled to and extend upwardly from the first edge 52 of the first board 50. The second board 56 generally has a height that is complementary to the height of the back opening 28 wherein the second board 56 blocks the back opening 28 when the tray 48 is positioned within the interior space 20 to inhibit access to the interior space 20 through the back opening 28.

A handle 58 may be coupled to and extend outwardly from the second board 56. The handle 58 is generally configured to facilitate a user in removing the tray 48 from the back opening 28.

A pair of lateral side boards 60 may be coupled to and extend upwardly from opposing lateral edges of the first board 50. The pair of lateral side boards 60 are generally coupled to and extend outwardly from opposing lateral edges of the second board 56.

Each of the pair of lateral side boards 60 may comprise a straight portion 62. The straight portion 62 may be positioned adjacent to the second board 56. The straight portion 62 may have a uniform height that is complementary to a height of the back opening 28 and the second board 56. A slanted portion 64 may extend between the straight portion 62 and the second edge 54 of the first board 50. The slanted portion 64 generally has a variable height wherein the slanted portion 64 is angled downwardly between the straight portion 62 and the second edge 54 of the first board 50.

A lip 66 may be coupled to and extending upwardly from a terminal edge 68 of the shelf 42. The lip 66 may be perpendicular with respect to the shelf 42. The terminal edge 68 of the shelf 42 where the lip 66 is positioned is generally distal to the base wall 14.

A rail 70 may be coupled to the lip 66. The rail 70 may be configured to define a resting area for a bird 72 that is perching on the rail 70. The rail 70 may have a length being complementary to a length of the lip 66.

A mount 74 may couple the rail 70 to the lip 66. The mount 74 may further comprise a first mounting rod 76 that is coupled to and extends upwardly from a free edge 78 of the lip 66. A second mounting rod 80 may be coupled to and extend upwardly from the free edge 78 of the lip 66. The second mounting rod 80 is generally spaced from the first mounting rod 76 wherein the first mounting rod 76 and the second mounting rod 80 are positioned proximate to opposing lateral ends of the lip 66.

A pair of panels 82 may be coupled to and extend upwardly from opposing lateral sides of the shelf 42. The pair of panels 82 may be angled downwardly toward the terminal edge 68 of the shelf 42 wherein each of the pair of panels 82 has a shape that is complementary to a shape of the slanted portion 64 of the pair of lateral side boards 60 of the tray 48. The pair of panels 82 may be transparent.

The pair of panels 82 may further comprise a first panel 84 that is coupled to and extends outwardly from a first side wall 86 of the pair of side walls 16 and a second panel 88 that is coupled to and extends outwardly from a second side wall 90 of the pair of side walls 16.

A pair of cushions 92 may be coupled to and extend outwardly from the border 36 past the front side 22 of the housing 12. The border 36 may be positioned between the pair of cushions 92 and the housing 12. The pair of cushions 92 is configured to support a lower edge 94 of a window 96 that is positioned within the window frame 38. At least a portion of the front side 22 of the housing 12 is configured to be blocked by the window 96 when the window 96 rests on the pair of cushions 92. The pair of cushions 92 may be padded to inhibit the window 96 from breaking if the window 96 slips, falls, or otherwise comes down hard and forcefully onto the pair of cushions 92.

The pair of cushions 92 may further comprise a first pad 98 that is positioned proximate to the first side wall 86 of the pair of side walls 16 and a second pad 100 that is spaced from the first pad 98 and that is positioned proximate to the second side wall 90 of the pair of side walls 16. The pair of cushions 92 is configured to support the window 96 above the shelf 42 whereby the open top side 46 of the shelf 42 remains exposed to permit access into the interior space 20 when the front side 22 of the housing 12 is blocked by the window 96. The exposed open top side 46 of the shelf 42 permits the bird 72, or other wildlife, to enter and exit the housing 12 even when the window 96 is closed over the front side 22 of the housing 12.

A plurality of holes 102 may extend through the housing 12 into the interior space 20. The plurality of holes 102 may be positioned on each of the pair of side walls 16 and the back wall 18. A plurality of dowels 104 may fit within the plurality of holes 102. For example, each dowel of the plurality of dowels 104 may be removably positionable in an associated hole of the plurality of holes 102 to define a perch. The perch is configured to support the bird 72 that is positioned within the interior space 20.

In use, bird food 106 may be placed on the tray 48. For example, when the housing 12 is mounted in the window frame 38, the tray 48 can be removed from indoors by pulling the tray 48 out of the back opening 28. Once removed, the tray 48 can be cleaned or refilled with bird food 106 to attract the bird 72 to the housing 12. The bird 72 can enter and exit the housing 12 through the open top side 46 of the shelf 42 when the window 96 is closed over the front side 22 of the housing 12. The user does not need to go outdoors to observe the bird 72 or to clean or replenish the window mounted bird feeder device 10.

The housing 12 may be transparent, for example so that a user may view the bird 72 and other wildlife that is positioned within the housing 12 when the housing 12 is mounted within a window frame 38. For example, the back side 30 of the housing 12 may be positioned within the building where the window frame 38 is located, with the front side 22 being open to permit a bird 72 to move in and out of the interior space 20. When the housing 12 is transparent, a user can view the bird 72. The plurality of holes 102 facilitate airflow through the housing 12, and permit airflow through the window frame 38 and into the room where the window frame 38 is located.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A birdhouse assembly being positionable in a window frame of a building, the birdhouse assembly comprising:
   a housing having a base wall being coupled to a pair of side walls and a back wall, each of the pair of side walls and the back wall extending upwardly from the base wall to define an interior space, a front side of the housing being open, a bottom edge of the back wall being spaced from a top surface of the base wall to define a back opening into the interior space through a back side of the housing;
   a border extending along the base wall, up each of the pair of side walls, and between the pair of side walls, the border being aligned with the front side of the housing, the border extending outwardly from the housing wherein the border is configured to physically abut a window frame whereby the border is configured to inhibit the housing from falling out of the window frame;
   a shelf being coupled to the housing and extending forwardly from the front side of the housing, the shelf having an upper surface being coplanar with the top surface of the base wall, the shelf having an open top side permitting access into the interior space of the housing; and
   a tray being removably positionable within the interior space through the back opening, the tray having a height being complementary to a height of the back opening such that the tray blocks the back opening when the tray is positioned within the interior space.

2. The birdhouse assembly of claim 1, the tray further comprising:
   a first board being parallel to the top surface of the base wall and the upper surface of the shelf when the tray is positioned within the interior space, the first board having a first edge and a second edge;
   a second board being coupled to and extending upwardly from the first edge of the first board, the second board having a height being complementary to the height of the back opening wherein the second board blocks the back opening when the tray is positioned within the interior space to inhibit access to the interior space through the back opening;
   a handle being coupled to and extending outwardly from the second board, the handle being configured to facilitate a user in removing the tray from the back opening;
   a pair of lateral side boards being coupled to and extending upwardly from opposing lateral edges of the first board, the pair of lateral side boards being coupled to and extending outwardly from the second board.

3. The birdhouse assembly of claim 2, each of the pair of lateral side boards further comprising:
   a straight portion, the straight portion being positioned adjacent to the second board, the straight portion having a uniform height; and
   a slanted portion extending between the straight portion and the second edge of the first board, the slanted portion having a variable height wherein the slanted portion is angled downwardly between the straight portion and the second edge of the first board.

4. The birdhouse assembly of claim 3, further comprising a pair of panels being coupled to and extending upwardly from opposing lateral sides of the shelf, the pair of panels being angled downwardly toward a terminal edge of the shelf wherein the pair of panels has a shape being complementary to a shape of the slanted portion of the pair of lateral side boards of the tray.

5. The birdhouse assembly of claim 4, the pair of panels further comprising:
   a first panel of the pair of panels being coupled to and extending outwardly from a first side wall of the pair of side walls; and
   a second panel of the pair of panels being coupled to and extending outwardly from a second side wall of the pair of side walls.

6. The birdhouse assembly of claim 4, further comprising a pair of cushions being coupled to and extending outwardly from the border past the front side of the housing, the border being positioned between the pair of cushions and the housing wherein the pair of cushions is configured to support a lower edge of a window being positioned within the window frame, wherein the front side of the housing is configured to be blocked by the window when the window rests on the pair of cushions, wherein the pair of cushions is configured to support the window above the shelf whereby the open top side of the shelf remains exposed to permit access into the interior space when the front side of the housing is blocked.

7. The birdhouse assembly of claim 1, further comprising a plurality of holes extending through the housing into the interior space.

8. The birdhouse assembly of claim 7, wherein the plurality of holes is positioned on each of the pair of side walls and the back wall.

9. The birdhouse assembly of claim 7, further comprising a plurality of dowels, each dowel of the plurality of dowels being removably positionable in an associated hole of the plurality of holes to define a perch, the perch being configured to support a bird being positioned within the interior space.

10. The birdhouse assembly of claim 1, further comprising a pair of cushions being coupled to and extending outwardly from the border past the front side of the housing, the border being positioned between the pair of cushions and the housing wherein the pair of cushions is configured to support a lower edge of a window being positioned within the window frame, wherein the front side of the housing is configured to be blocked by the window when the window rests on the pair of cushions, wherein the pair of cushions is configured to support the window above the shelf thereby permitting access to the interior space through the open top side of the shelf when the front side of the housing is blocked.

11. The birdhouse assembly of claim 10, the pair of cushions further comprising:
   a first pad being positioned proximate to the first side wall of the pair of side walls; and
   a second pad being spaced from the first pad and being positioned proximate to the second side wall of the pair of side walls.

12. The birdhouse assembly of claim 1, further comprising:
   a top edge of each of the pair of side walls and the back wall defining an upper opening into the interior space of the housing; and
   a lid being removably couplable to the top edge, the lid being slidably engageable with the top edge to close the upper opening and inhibit access into the interior space of the housing through the upper opening, the lid being foraminous to facilitate airflow through the housing.

13. The birdhouse assembly of claim 1, further comprising:
   a lip being coupled to and extending upwardly from a terminal edge of the shelf; and
   a rail being coupled to the lip, the rail being configured to define a resting area for a bird perching on the rail.

14. A birdhouse assembly being positionable in a window frame of a building, the birdhouse assembly comprising:
   a housing having a base wall being coupled to a pair of side walls and a back wall, each of the pair of side walls and the back wall extending upwardly from the base wall to define an interior space, a front side of the housing being open, a bottom edge of the back wall being spaced from a top surface of the base wall to define a back opening into the interior space through a back side of the housing, a top edge of each of the pair of side walls and the back wall defining an upper opening into the interior space of the housing, the housing being transparent;
   a border extending along the base wall, up each of the pair of side walls, and across the upper opening between the top edges of each of the pair of side walls, the border being aligned with the front side of the housing, the border extending outwardly from the housing wherein the border is configured to provide a physical abutment against a window frame whereby the border is configured to inhibit the housing from falling out of the window frame;
   a lid being removably couplable to the top edge, the lid being slidably engageable with the top edge to close the upper opening and inhibit access into the interior space of the housing through the upper opening, the lid being foraminous to facilitate airflow through the housing, the lid being transparent;
   a shelf being coupled to the housing and extending forwardly from the front side of the housing, the shelf having an upper surface being coplanar with the top surface of the base wall, the shelf being an integral extension of the base wall, the shelf having an open top side permitting access into the interior space of the housing;
   a tray being removably positionable within the interior space through the back opening, the tray having a length being complementary to a combined length of the base wall and the shelf such that the tray covers the top surface of the base wall and the upper surface of the shelf when the tray is positioned within the interior space, the tray having a height being complementary to a height of the back opening such that the tray blocks the back opening when the tray is positioned within the interior space, the tray being transparent, the tray further comprising:
      a first board being parallel to the top surface of the base wall and the upper surface of the shelf when the tray is positioned within the interior space, the first board having a first edge and a second edge;
      a second board being coupled to and extending upwardly from the first edge of the first board, the second board having a height being complementary to the height of the back opening wherein the second board blocks the back opening when the tray is positioned within the interior space to inhibit access to the interior space through the back opening;
      a handle being coupled to and extending outwardly from the second board, the handle being configured to facilitate a user in removing the tray from the back opening;
      a pair of lateral side boards being coupled to and extending upwardly from opposing lateral edges of the first board, the pair of lateral side boards being coupled to and extending outwardly from the second board, each of the pair of lateral side boards comprising:
         a straight portion, the straight portion being positioned adjacent to the second board, the straight portion having a uniform height being complementary to a height of the back opening;
         a slanted portion extending between the straight portion and the second edge of the first board, the slanted portion having a variable height wherein the slanted portion is angled downwardly between the straight portion and the second edge of the first board;
   a lip being coupled to and extending upwardly from a terminal edge of the shelf, the lip being perpendicular with respect to the shelf, the lip being distal to the base wall;
   a rail being coupled to the lip, the rail being configured to define a resting area for a bird perching on the rail, the rail having a length being complementary to a length of the lip;

a pair of panels being coupled to and extending upwardly from opposing lateral sides of the shelf, the pair of panels being angled downwardly toward the terminal edge of the shelf wherein the pair of panels has a shape being complementary to a shape of the slanted portion of the pair of lateral side boards of the tray, the pair of panels being transparent, the pair of panels further comprising:
- a first panel of the pair of panels being coupled to and extending outwardly from a first side wall of the pair of side walls;
- a second panel of the pair of panels being coupled to and extending outwardly from a second side wall of the pair of side walls;

a pair of cushions being coupled to and extending outwardly from the border past the front side of the housing, the border being positioned between the pair of cushions and the housing wherein the pair of cushions is configured to support a lower edge of a window being positioned within the window frame, wherein the front side of the housing is configured to be blocked by the window when the window rests on the pair of cushions, the pair of cushions further comprising:
- a first pad being positioned proximate to the first side wall of the pair of side walls;
- a second pad being spaced from the first pad and being positioned proximate to the second side wall of the pair of side walls;
- wherein the pair of cushions is configured to support the window above the shelf whereby the open top side of the shelf remains exposed to permit access into the interior space when the front side of the housing is blocked;

a plurality of holes extending through the housing into the interior space, the plurality of holes being positioned on each of the pair of side walls and the back wall; and a plurality of dowels, each dowel of the plurality of dowels being removably positionable in an associated hole of the plurality of holes to define a perch, the perch being configured to support a bird being positioned within the interior space.

* * * * *